United States Patent
Netsch

(10) Patent No.: US 7,055,097 B1
(45) Date of Patent: May 30, 2006

(54) DISPLAYING A LARGE AMOUNT OF INFORMATION IN A BROWSER WINDOW

(75) Inventor: Tana Netsch, Campbell, CA (US)

(73) Assignee: Group 1 Software, Inc., Lanham, MD (US)

( * ) Notice: Subject to any disclaimer, the term of this patent is extended or adjusted under 35 U.S.C. 154(b) by 754 days.

(21) Appl. No.: 10/072,131

(22) Filed: Feb. 5, 2002

(51) Int. Cl.
*G06F 17/24* (2006.01)

(52) U.S. Cl. .................................... 715/526

(58) Field of Classification Search ............... 715/526
See application file for complete search history.

(56) References Cited

U.S. PATENT DOCUMENTS

| | | | |
|---|---|---|---|
| 5,893,109 A * | 4/1999 | DeRose et al. | 707/10 |
| 5,930,794 A | 7/1999 | Linenbach et al. | |
| 6,038,558 A | 3/2000 | Powers et al. | |
| 6,237,030 B1 * | 5/2001 | Adams et al. | 709/218 |
| 6,243,698 B1 | 6/2001 | Powers et al. | |
| 6,317,737 B1 | 11/2001 | Gorelik et al. | |
| 6,769,096 B1 * | 7/2004 | Kuppusamy et al. | 715/530 |
| 2002/0054126 A1 * | 5/2002 | Gamon | 345/781 |
| 2004/0054968 A1 * | 3/2004 | Savage | 715/513 |

OTHER PUBLICATIONS

Lemay, Laura, Sams Teach Yourself Web Publishing with HTML 4 in 21 Days (Sams Publishing, © 2000).*
www.ewita.com/EWITA%20Tools/ptrv/menu/frameset.html , as published on Nov. 7, 1999.*
www.javaworld.com/javaworld/jw-11-2001/jw-1130-jscroll_.html, as published on Nov. 30, 2001.*
www.w3.org/TR/WD-frames-970331, as published on Mar. 31, 1997.*
www10.org/cdrom/papers/594/, as published on May 5, 2001.*

* cited by examiner

*Primary Examiner*—Doug Hutton
(74) *Attorney, Agent, or Firm*—Eric P. Halber; Angelo N. Chaclas; Steven J. Shapiro

(57) ABSTRACT

A method for facilitating display of content in a browser window includes receiving a user request for content, determining that the requested content cannot be displayed in a browser window using a single page, and generating code which, when executed, causes the display of the requested content to be divided into multiple frames. Each frame displays a portion of the requested content. The frames displayed in the browser window appear to the user as a single page containing the requested content.

26 Claims, 5 Drawing Sheets

DISPLAYING A LARGE AMOUNT OF INFORMATION IN A BROWSER WINDOW

FIELD OF THE INVENTION

The present invention relates to presenting information on a screen; more particularly, the present invention relates to displaying a large amount of data in a browser window.

BACKGROUND OF THE INVENTION

The Internet, Web Browsers and HTML/DHTML are not oriented towards the display of large amounts of information. Specifically, existing web browsers (e.g., Internet Explorer™, Netscape™ Navigator™, etc.) exhibit severe performance degradation when web pages contain any sizable number of formatting elements. The formatting elements (also known as markup tags) may be used, for example, to define the page layout, fonts and graphic elements, as well as the hypertext links to other documents on the Internet.

Because of the browser performance problem, some additional mechanisms are used when a user's request generates a large amount of information for display. For example, the information may be converted into a commonly-known file format (e.g., "PDF", Word, Excel, etc.), downloaded to the user's machine, and displayed using a "plug-in" application or an application already installed on the user's machine. Another common mechanism for handling a large display of data divides the display into page-sized or screen-sized portions, displays one portion, and then provides navigation links to the remaining portions.

The above techniques require the user to spend additional time and effort for accessing data to be browsed. Thus, it would be advantageous to provide an efficient and convenient mechanism for displaying large amounts of information directly to the user in a browser window.

SUMMARY OF THE INVENTION

A method and apparatus for facilitating display of content in a browser window are described. According to one aspect, the method includes receiving a user request for content, determining that the requested content cannot be displayed in a browser window using a single page, and generating code which, when executed, causes the display of the requested content to be divided into multiple frames. Each frame displays a portion of the requested content. The frames displayed in the browser window appear to the user as a single page containing the requested content.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
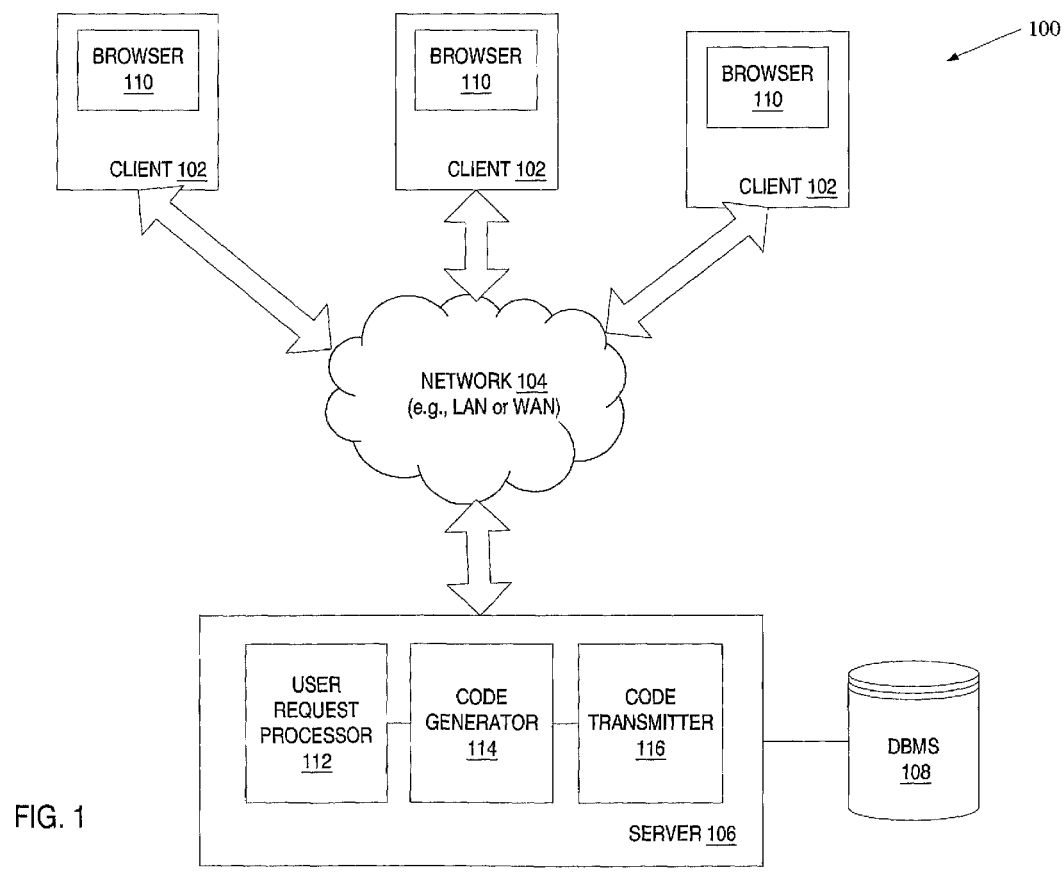
FIG. 1 is a block diagram of one embodiment of a system for facilitating display of content in a browser.

A method and apparatus for facilitating display of content in a browser window are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Existing web browsers (e.g., Internet Explorer™, Netscape™ Navigator™, etc.) exhibit performance degradation when the number of formatting elements (e.g., HTML tags) contained in a web page exceeds a browser-specific threshold number. Accordingly, a large amount of information (e.g., a report with thousands of rows of data containing hundreds of columns) cannot be displayed directly to the user in a browser window when requested.

The present invention addresses the problem with the browser's performance by using multiple frames that display portions of the requested content. Specifically, when data pertaining to a user request for content is received, a determination is made as to whether the requested content can be displayed in a browser window using a single page. A single page referred to herein represents a web page, a mobile device page, or any other page that is viewable using any known in the art browser. In one embodiment, the determination begins with calculating the number of formatting elements that are required for displaying the requested content using one page. The formatting elements (also known as markup tags) may be used, for example, to define the page layout, fonts and graphic elements, as well as the hypertext links to other documents on a public network. Further, the calculated number of formatting elements is compared with a threshold value. The threshold value is the number of formatting elements, at which the performance of the browser starts deteriorating, i.e., the browser becomes unable to display the requested counter with sufficient speed and quality.

If the calculated number of formatting elements exceeds the threshold value, the code is generated which, when executed, causes the display of the requested content to be divided into multiple frames that display portions of the requested content. Frames referred to herein represent independent sections on a display screen that are built by the browser as separate pages. Each frame is associated in the code with a set of parameters that specify, for example, the name of the frame, the location of content that will load into the frame, attributes pertaining to the frame's borders and scrolling, etc. In one embodiment, the code is presented as a master (or parent) markup language document (e.g., a frameset HTML document) that identifies a set of one or more frames associated with child markup language documents. In one embodiment, the frames are inline frames. Inline frames (also known as floating frames) are a feature supported by the HTML 4.0 standard that allows the insertion of pages inside other pages. Alternatively, any other types of frames, such as HTML frames, can be used to display the requested content.

In one embodiment, the parameters associated with the frames specify that the frames should be displayed consecutively and without the borders. Accordingly, when the browser displays the frames loaded with data, their borders are invisible, and the content appears to the user as contained in a single page.

In one embodiment, the code includes instructions (e.g., dynamic HTML (DHTML) scripting) that allow the frames to request their content portions independently. As a result, the time required for building the display of the requested content is reduced. Furthermore, because the browser treats each frame as an independent page, the negative effect of the size of the requested content on the browser performance can be reduced and potentially minimized.

Facilitating Display of Content in a Browser

FIG. 1 is a block diagram of one embodiment of a system 100 for facilitating display of content in a browser. System 100 includes multiple client devices (referred to herein as "clients") 102 that communicate with a server 106 via a network 104. Network 104 may be any private network (e.g., LAN, Intranet, etc.) or any public network (e.g., Internet, wireless network, etc.).

Clients 102 represent any devices that may enable user's access to data. Such devices may include, for example, a conventional computer system, a network computer or thin client device (e.g., WebTV Networks™ Internet terminal or Oracle™ NC), a laptop or palm-top computing device (e.g., Palm Pilots), etc. Clients 102 use client application programs 110 known as browsers (e.g., the Netscape™ Navigator™, the Internet Explorer™, the user interface of America On-Line™, the wireless application platform (WAP) browser, etc.) to access graphical and textual data or video, audio, or tactile data provided by server 106.

Server 106 receives user requests for content from clients 102, generates code in the form of markup language documents for performing user requests, and sends the markup language documents back to clients 102 for display by browsers 110. A markup language document referred to herein is a master (or parent) markup language document such as a frameset HTML document that identifies a set of frames associated with child markup language documents.

While the markup language documents are being displayed, the code inside these documents causes clients 102 to request the desired content from server 106. It should be noted that the code generated by code generator 114 does not need to be presented in the form of a markup language document. Instead, the code can be presented in any other form that can be used with the browser to display the requested content to the user.

Once server 106 receives a content request from client 102, it forwards this request to a corresponding content source such as a database management system (DBMS) 108. DBMS 108 may include a data warehouse where data is consolidated and fed to smaller data warehouses (called data marts). Alternatively, the data warehouse and data mart functions are both performed by DBMS 108. Data may be stored in a relational database such as, for example, a Microsoft SQL Server database, an Oracle database, a Sybase database, DB2, etc. Alternatively, data may be stored in a flat-file database, network database, or a hierarchical database.

In one embodiment, server 106 includes a user request processor 112 to process each user request, a code generator 114 to generate a markup language document for displaying the requested content to the user, and a code transmitter 116 to transmit the markup language document to client 102. At client 102, browser 110 executes the code inside the markup language document to display the requested content to the user.

User request processor 112 is responsible for receiving data pertaining to a user request for content and determining whether the requested content may be displayed in the browser window using a single page. Specifically, as described above, the performance of the browser depends on the number of formatting elements (e.g., markup tags) contained in a page being displayed. For example, when the number of HTML tags in a web page exceeds a threshold associated with a specific browser, the browser exhibits significant performance degradation when rendering the requested content on the screen. In one embodiment, user request processor 112 makes the determination by analyzing data pertaining to the user request and calculating how many formatting elements are needed to display the requested content as a single page. Data pertaining to the user request may be in the form of a query execution plan or in any other form. A query execution plan defines the steps to retrieve and view the requested content. For example, the plan may include a data source step, a data transform step, and a data viewing step. The number of formatting elements contained in the page primarily depends on the complexity of the desired layout and format of the displayed content.

Further, user request processor 112 compares the resulting number of formatting elements with a threshold number. If the resulting number of formatting elements does not exceed the threshold number, code generator 114 generates a single page (e.g., an HTML page) according to the user request. Otherwise, if the resulting number of formatting elements exceeds the threshold number, code generator 114 generates a master markup language document that identifies multiple frames for displaying portions of the requested content. The frames may be inline frames or any other types of frames that are treated by the browser as independent pages. In one embodiment, code generator 114 calculates the number of frames required for displaying the requested content based on the number of formatting elements calculated by user request processor 112 and the threshold number.

Code generator 114 associates each frame with a set of parameters including, for example, a frame border parameter, a content source parameter, a frame name parameter, height and width parameters, an align parameter, etc. The frame border parameter may specify that the frame will not have borders. The content source parameter may specify the location of the requested content and identify the content portion that will load into this frame. The height and width parameters specify the size of each frame. The align parameter specifies the position of the frame with respect to the surrounding content. It should be noted that various parameters other than, or in addition to, those described above may be associated with each frame in the master markup language document.

Further, in one embodiment, code generator 114 creates a set of instructions, which, when executed by browser 110, cause each frame to request its portion of the requested content from server 106. In one embodiment, these instructions include a set of parameters that identify a portion of content associated with each frame and the code that causes each frame to submit a request for its portion of content to server 106 independently. For example, the set of parameters may represent input elements in a form element, and the code may be a DHTML script. A form such as an HTML form provides a mechanism for transmitting data to a web server. Input elements identify the data portion that needs to be requested from a content source (e.g., the specific rows in a database table), the name of a destination frame (i.e., the frame that should receive the requested data portion), and various other parameters. The form may be submitted to server 106 using the DHTML scripting included in the parent markup language document.

Once the data loads into the frame, the frame with the loaded data is displayed. While this frame is displayed, the other frames are getting loaded with data. The user only sees the frames that are already loaded with data and are fully operational. As defined by the parameters in the markup language document, the frames with loaded data are displayed consecutively, right next to each other, and with invisible borders. As a result, the displayed content appears to be contained in one seamless page. In one embodiment, the parent markup language document also includes code (e.g., asynchronous DHTML scripting) that causes the displayed content to function as contained in a single page in response to any user interaction with the displayed content.

Figure 2:
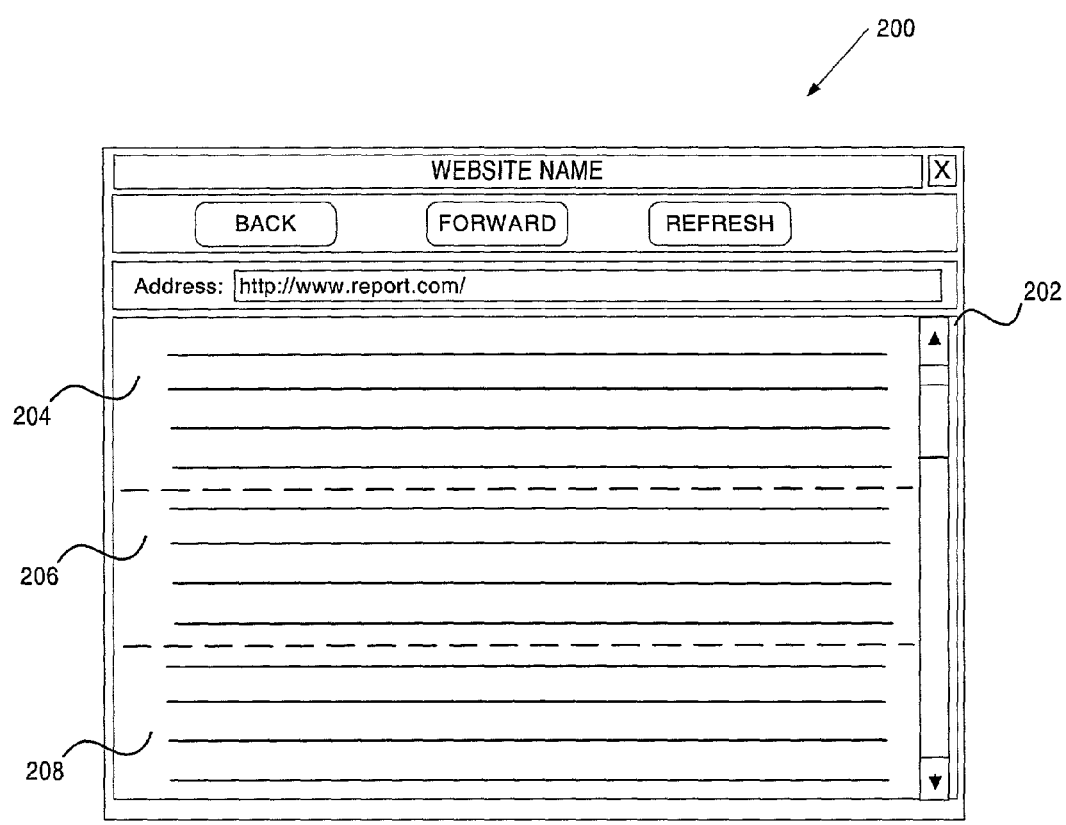
FIGS. 2 and 3 illustrate exemplary display screens that present requested content.

In one embodiment, the frames are positioned vertically on the display screen. FIG. 2 illustrates an exemplary screen 200 displaying vertically positioned frames.

Referring to FIG. 2, screen 200 includes a browser window 202 that displays content loaded into frames 204 through 208. Frames 204 through 208 are positioned vertically, right next to each other, and do not have visible borders. As a result, the content in the frames appears to the user as contained in one seamless page. The browser window includes a scroll bar to scroll data up and down. In one embodiment, the parent markup language document displays the first portion of the content (portion 204), and the remaining content portions are displayed in frames 206 and 208.

Figure 3:
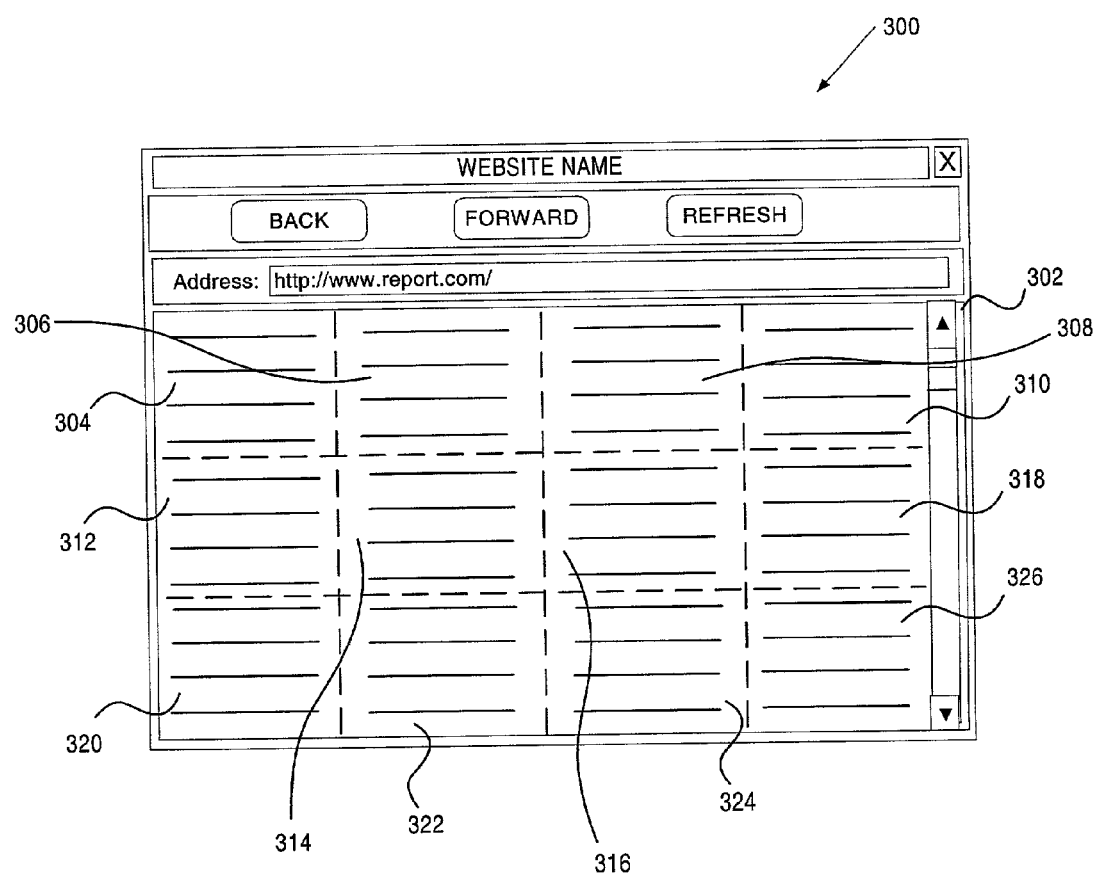

In another embodiment, the frames are positioned both vertically and horizontally, depending on the desired layout of content display. For example, if the desired layout includes a set of columns, each frame may be designated to display data (or portion of data) in one column. FIG. 3 illustrates an exemplary screen 300 displaying horizontally positioned frames.

Referring to FIG. 3, screen 300 includes a browser window 302 that displays content loaded into frames 304 through 326. The content is displayed in columns, with each frame occupying a portion of a column. For example, frames 304, 312 and 320 are designated to display data in a first column. Frames 306, 314 and 322 are designated to display data in a second column. Frames 308, 316 and 324 are designated to display data in a third column. Frames 310, 318 and 326 are designated to display data in a fourth column. Because all frames 304 through 326 have invisible borders and the neighboring frames (e.g., frames 304 and 306, frames 304 and 312, etc.) are positioned next to each other, the content appears to the user as contained in one large page.

In one embodiment, the parent markup language document includes code (e.g., DHTML scripting) that causes each column to operate independently from other columns. Specifically, this code causes the entire column to behave as a single unit, even when this column consists of multiple frames. For example, if the user selects a column by clicking on its heading, the entire content of this column becomes highlighted.

Further, the user may choose to interact with the requested content before all content portions are loaded into the frames. That is, the user perceives the content as contained in a single page that is displayed by one process. Accordingly, when the user sees the first full screen of data and has not scrolled any further yet, the user expects that the entire content has been already loaded and may choose to change the look of the display before the loading of all content portions is completed. For example, the user may decide to change the order of the columns by dragging and dropping a column to a new location and expects to see the entire content of this column in the new location. In one embodiment, the parent markup language document includes a designated script (e.g., a DHTML script) to ensure that the displayed content behaves as a seamlessly integrated page in accordance with the user's expectation. In one embodiment, the integration is achieved by the parent markup language document handling the user action for its own portion of the content and then calling a designated function which manages the execution of the user action in each of the frames, whether the frames have content yet or not. In one embodiment, the designated function is associated with a time window parameter that defines a time interval (e.g., 1 millisecond) during which the designated function should be executed. The time window parameter causes the requested action to be executed for each frame asynchronously, i.e., the request of each frame is submitted to, and executed on, the server independently from the requests of other frames.

In one embodiment, the parent markup language document further includes a script (e.g., DHTML scripting) that interrupts the loading of content portions into the frames when the user stops viewing the displayed content. As a result, the frames no longer make content requests to the server, and the browser becomes available for new operations.

Figure 4:
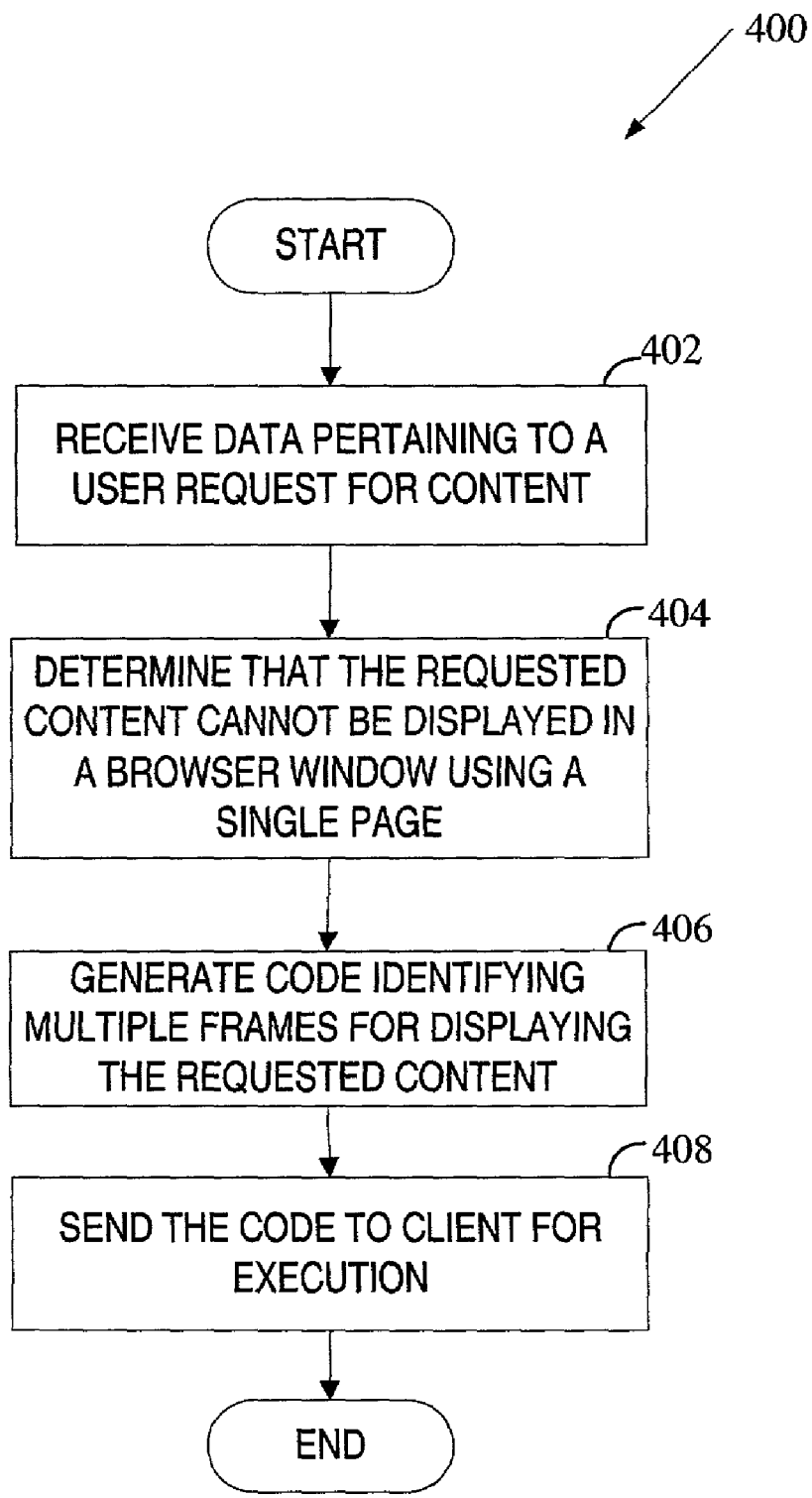
FIG. 4 is flow diagram of one embodiment of a process for facilitating display of content in a browser.

FIG. 4 is a flow diagram of one embodiment of a process 400 for facilitating display of content in a browser window. The process may be performed by processing logic that may comprise hardware (e.g., circuitry, dedicated logic, etc.), software (such as run on a general purpose computer system or a dedicated machine), or a combination of both.

Referring to FIG. 4, process 400 begins with processing logic receiving data pertaining to a user request for content (processing block 402). This data may be in the form of a query execution plan or in any other form that indicates the desired layout and/or format of the requested data.

At processing block 404, processing logic determines that the requested content cannot be displayed in a browser window using a single page. In one embodiment, processing logic makes this determination by analyzing the data pertaining to the user request, calculating how many formatting elements are needed to display the requested content as a single page, and determining that resulting number of formatting elements exceeds a threshold number.

At processing block 406, processing logic generates code (i.e., in the form of a master markup language document) that uses multiple frames for displaying portions of the requested content. The frames may be inline frames or any other types of frames that are treated by the browser as independent pages. In one embodiment, processing logic calculates the number of frames to be included in the code. The number of frames depends on the resulting number of formatting elements and the threshold number. As described above, the code includes a set of parameters for each frame. These parameters cause each frame to request its portion of content from the content source during the execution of the code. The parameters also ensure that only the content (and not the frames themselves) is visible to the user when the frames with loaded content are displayed in the browser window.

At processing block 408, processing logic sends the code to a client device where the code is executed by the browser. During the execution of the code, the display of the requested content is divided into multiple frames that hold subsets of the requested content. Because the frames themselves are invisible to the user, the subsets of the requested content appear to the user as contained in one large page.

An Exemplary Computer System

Figure 5:
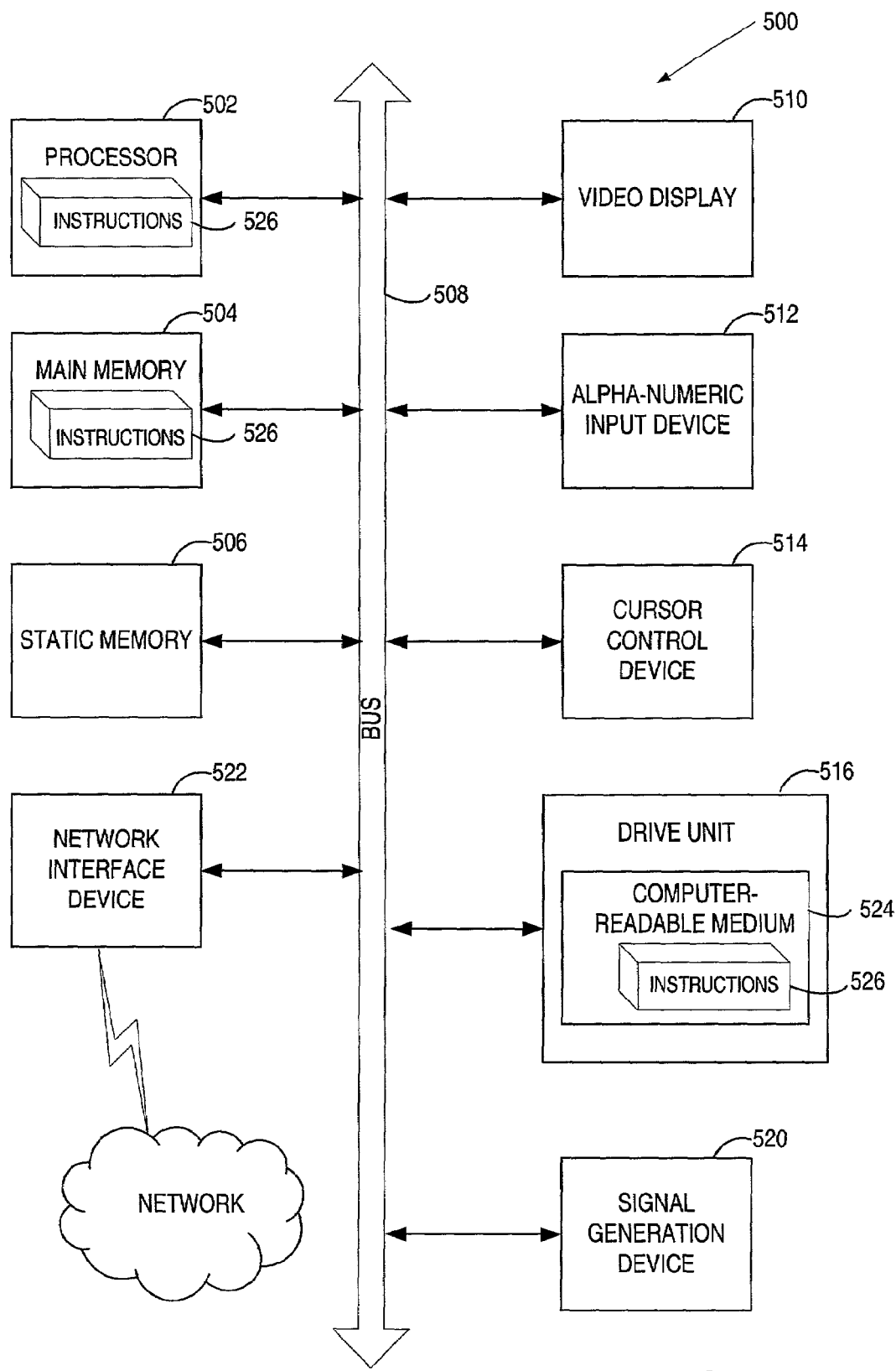
FIG. 5 is a block diagram of an exemplary computer system.

FIG. 5 is a block diagram of an exemplary computer system 500 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 520 (e.g., a speaker) and a network interface device 522.

The disk drive unit 516 includes a computer-readable medium 524 on which is stored a set of instructions (i.e., software) 526 embodying any one, or all, of the methodologies described above. The software 526 is also shown to reside, completely or at least partially, within the main memory 504 and/or within the processor 502. The software 526 may further be transmitted or received via the network interface device 522. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

The invention claimed is:

1. A method comprising:
   receiving data pertaining to a user request for content;
   determining that the requested content cannot be displayed in a browser window using a single page; and
   generating code which, when executed, causes a display of the requested content to be divided into a plurality of frames displaying corresponding portions of the requested content in the browser window, the plurality of frames appearing to a user as a single page containing the requested content,
   wherein determining that the requested content cannot be displayed in the browser window includes:
   calculating the number of formatting elements needed for display of the requested content in the browser window using a single page; and
   determining that the calculated number of formatting elements exceeds a predefined threshold.

2. The method of claim 1 wherein the code is presented in the form of a markup language document identifying the plurality of frames associated with child markup language documents.

3. The method of claim 1 wherein each of the plurality of frames has invisible borders and is positioned immediately after a preceding frame.

4. The method of claim 1 wherein each of the plurality of frames is associated in the code with a set of parameters that cause said each of the plurality of frames to request the corresponding portion of the requested content from a content source during the execution of the code.

5. The method of claim 4 wherein the plurality of frames request corresponding portions of the requested content in parallel.

6. The method of claim 1 wherein each of the plurality of frames in the code includes instructions that causes the plurality of frames to operate as a single page in response to user interaction with the displayed content.

7. The method of claim 1 wherein the data pertaining to the user request is a query execution plan.

8. The method of claim 1 further comprising:
Calculating the number of frames required to display the requested content.

9. The method of claim 8 wherein the number of frames depends on a layout of the display of the requested content.

10. The method of claim 9 wherein:
the layout includes a set of columns; and
each of the plurality of frames is designated to display data in a particular column within the set of columns.

11. The method of claim 1 wherein each of the plurality of frames is an inline frame.

12. The method of claim 1 further comprising:
sending the code to a client device for execution.

13. An apparatus comprising:
a user request processor to receive data pertaining to a user request for content and to determine that the requested content cannot be displayed in a browser window using a single page; and
a code generator to generate code which, when executed, causes a display of the requested content to be divided into a plurality of frames displaying corresponding portions of the requested content in the browser window, the plurality of frames appearing to a user as a single page containing the requested content,
wherein the user request processor is to determine that the requested content cannot be displayed in the browser window by calculating the number of formatting elements needed for display of the requested content in the browser window using a single page and determining that the calculated number of formatting elements exceeds a predefined threshold.

14. The apparatus of claim 13 wherein the code is presented in the form of a markup language document identifying the plurality of frames associated with child markup language documents.

15. The apparatus of claim 13 wherein each of the plurality of frames has invisible borders and is positioned immediately after a preceding frame.

16. The apparatus of claim 13 wherein each of the plurality of frames is associated in the code with a set of parameters that cause said each of the plurality of frames to request the corresponding portion of the requested content from a content source during the execution of the code.

17. The apparatus of claim 16 wherein the plurality of frames request corresponding portions of the requested content in parallel.

18. The apparatus of claim 13 wherein each of the plurality of frames in the code includes instructions that causes the plurality of frames to operate as a single page in response to user interaction with the displayed content.

19. The apparatus of claim 13 wherein the data pertaining to the user request is a query execution plan.

20. The apparatus of claim 13 wherein the code generator is further to calculate the number of frames required to display the requested content.

21. The apparatus of claim 20 wherein the number of frames depends on a layout of the display of the requested content.

22. The apparatus of claim 21 wherein:
the layout includes a set of columns; and
each of the plurality of frames is designated to display data in a particular column within the set of columns.

23. The apparatus of claim 13 wherein each of the plurality of frames is an inline frame.

24. An apparatus comprising:
means for receiving data pertaining to a user request for content;
means for determining that the requested content cannot be displayed in a browser window using a single page; and
means for generating code which, when executed, causes a display of the requested content to be divided into a plurality of frames displaying corresponding portions of the requested content in the browser window, the plurality of frames appearing to a user as a single page containing the requested content.

25. A system comprising:
a client computer to receive a user request for content; and
a server, coupled to the client computer over a network, to calculate the number of formatting elements needed to display the requested content in a browser window using a single page, to determine that the calculated number of formatting elements exceed a predefined threshold such that the requested content cannot be displayed in the browser window of the client computer, to generate a markup language document according to the user request for content, wherein the generated markup language document causes a display of the requested content to be divided into a plurality of frames with invisible borders which display corresponding portions of the requested content in the browser window, and to send the markup language document to the client computer for display, the markup language document being displayed in the browser window as a single page.

26. A tangible computer readable medium comprising executable instructions which when executed on a processing system cause said processing system to perform a method comprising:
receiving data pertaining to a user request for content from a client device;
calculating the number of formatted elements needed to display the requested content in a browser window using a single page; and
determining that the calculated number of formatting elements exceeds a predefined threshold such that the requested content cannot be displayed in a browser window using a single page; and
generating a script which, when executed, causes a display of the requested content to be divided into a plurality of frames with invisible borders which display corresponding portions of the requested content in the browser window, the plurality of frames appearing to a user as a single page in the browser window containing the requested content.

* * * * *